(12) United States Patent
Lozman et al.

(10) Patent No.: US 8,740,372 B2
(45) Date of Patent: Jun. 3, 2014

(54) PROCESS, DISPERSION, INK AND USE

(75) Inventors: Owen Roger Lozman, Manchester (GB); Thomas Paul, Manchester (GB); Christopher John Potter, Manchester (GB)

(73) Assignee: Fujifilm Imaging Colorants Limited (GB)

( * ) Notice: Subject to any disclaimer, the term of this patent is extended or adjusted under 35 U.S.C. 154(b) by 0 days.

(21) Appl. No.: 13/882,587

(22) PCT Filed: Nov. 8, 2011

(86) PCT No.: PCT/GB2011/052170
§ 371 (c)(1),
(2), (4) Date: Apr. 30, 2013

(87) PCT Pub. No.: WO2012/069805
PCT Pub. Date: May 31, 2012

(65) Prior Publication Data
US 2013/0229471 A1    Sep. 5, 2013

(30) Foreign Application Priority Data

Nov. 25, 2010  (GB) .................................. 1019996.6
Apr. 14, 2011  (GB) .................................. 1106324.5

(51) Int. Cl.
*G01D 11/00* (2006.01)
*C08K 9/00* (2006.01)

(52) U.S. Cl.
USPC .......................................... 347/100; 523/200

(58) Field of Classification Search
USPC ............. 347/100; 106/31.13, 31.28; 523/160, 523/200, 205, 400; 524/365, 377, 379, 560
See application file for complete search history.

(56) References Cited

U.S. PATENT DOCUMENTS

| 8,338,558 B2 * | 12/2012 | Richards et al. ................ 528/49 |
| 8,487,051 B2 * | 7/2013 | Richards et al. ............... 525/455 |
| 2004/0242726 A1 | 12/2004 | Waki et al. |

FOREIGN PATENT DOCUMENTS

| EP | 1364997 A2 | 11/2003 |
| EP | 1897919 A1 | 3/2008 |
| WO | 2005/061087 A1 | 7/2005 |
| WO | 2006/064193 A1 | 6/2006 |
| WO | 2007/126145 A2 | 11/2007 |
| WO | 2010/038070 A1 | 4/2010 |
| WO | 2010/038071 A1 | 4/2010 |

OTHER PUBLICATIONS

International Search Report issued from corresponding PCT/GB2011/052170, dated Jan. 17, 2012.

* cited by examiner

*Primary Examiner* — Anh T. N. Vo
(74) *Attorney, Agent, or Firm* — Banner & Witcoff, Ltd.

(57) ABSTRACT

A process for preparing a dispersion of encapsulated solid particles in a predominantly organic liquid vehicle, comprising the following steps: i) providing a dispersion comprising a particulate solid, a liquid medium and a polymeric dispersant having at least 3.0 mmoles of reactive groups per g of dispersant; ii) cross-linking the polymeric dispersant via at least some, but not all, of the reactive groups, said cross-linking being performed in the presence of the particulate solid and the liquid medium and resulting in the encapsulation of each solid particle with a cross-linked polymeric dispersant shell; iii) covalently bonding an end-capping agent to the polymeric dispersant via the reactive groups; said process being such that the final organic liquid vehicle comprises one or more organic liquids and optionally water, provided that water is present at no more than 30% by weight based on the dispersion.

20 Claims, No Drawings

PROCESS, DISPERSION, INK AND USE

RELATED APPLICATION DATA

This application is a National Stage Application under 35 U.S.C. 371 of co-pending PCT application PCT/GB2011/052170 designating the United States and filed Nov. 8, 2011; which claims the benefit of GB patent application number 1106324.5 and filed Apr. 14, 2011 and also claims the benefit of GB patent application number 1019996.6 and filed Nov. 25, 2010 each of which are hereby incorporated by reference in their entireties.

TECHNICAL FIELD

The present invention relates to a process for preparing an encapsulated particulate solid dispersion in a predominantly organic liquid vehicle, to the dispersions obtainable by the process, to predominantly organic ink jet printing inks containing the dispersion and to the use of ink jet printing inks for printing onto a substrate.

BACKGROUND

Particulate solid dispersions are used in many fields including pharmaceuticals, agrochemicals, paints and especially inks. For many different reasons it is advantageous to provide colloidally stable dispersions. For aqueous dispersions achieving stability is more easy, not least because more dispersants are available which are well suited to aqueous liquid vehicles. For predominantly organic liquid media we have found it substantially more difficult to prepare colloidal stable dispersions. We have found that it is more difficult to prepare very fine dispersions of particulate solids in predominantly organic liquid vehicles. Thus, sub-micron sized particles are especially difficult to prepare in organic liquid vehicles.

Pigments (as particulate solids) may be used to prepare inks, paints, tints and especially ink jet printing inks.

Pigment inks tend to have better ozone-fastness and light-fastness than for example dye-based inks. However, because the pigment is in the form of a particulate dispersion (rather than a solution) there is a tendency for pigment particles to agglomerate or flocculate whilst the ink is being stored and/or whilst the ink is being used (e.g. printed). Such agglomeration or flocculation before the ink has been printed onto a substrate is highly undesirable, particularly in ink jet printing inks where the printer nozzles are very small and are susceptible to blockage by any oversized particulate matter. Thus, in the ink jet field a great deal of effort has been spent attempting to increase the colloidal stability of pigment dispersions.

We have found that it is particularly difficult to provide pigment dispersions and inks having good colloidal stability when the liquid vehicle is completely or predominantly comprised of organic liquids.

It is often difficult to adequately obtain a sufficiently fine (sub-micron) sized pigment dispersion.

It is also desirable to provide pigment inks in predominantly or completely organic liquid vehicles which offer high optical density (OD), especially when printed onto plain paper.

UV curable ink jet printing inks comprise sub micron sized pigment particles dispersed in a UV curable organic liquid vehicle. Examples of UV curable organic liquid vehicles include for example those comprising styrenic and/or (meth) acrylic monomers. It can sometimes be difficult to mill a pigment in such UV curable compositions as the time and energy required to prepare sub micron sized dispersions can cause premature reaction or gellation of the UV curable composition. Such pre reacted or gelled components can be very difficult to remove and can significantly impair the performance of ink jet printing inks made from such compositions.

PRIOR ART

The conventional method in the art to prepare a dispersion of a pigment in a predominantly organic liquid vehicle is to mill a composition comprising the pigment, the organic liquid media and a conventional dispersant. Such a dispersant would be chosen so as to be compatible with the final organic liquid vehicle. The dispersant would be merely physically adsorbed onto the pigment surface.

Less commonly and more recently, it is known in the art to prepare encapsulated pigments. Whilst there are many methods by which to encapsulate pigment particles one method is by cross-linking a dispersant in the presence of a pigment and a liquid medium. However, known art relating to this method has centred on aqueous dispersions and inks. Examples of such a method include PCT patent publication WO 2006/064193 and WO 2010/038071.

Very recently we have discovered ways to post react certain encapsulated pigment dispersions so as to improve properties such as final print optical density and dispersion stability. Importantly, however this approach relates exclusively to aqueous dispersions. This approach is disclosed in PCT patent publication WO 2010/038070.

Commercially, there still remains a need for particulate solid dispersions and inks in predominantly or completely organic liquid vehicles which solve, at least in part one or more of the above problems.

We have now surprising found a new process for preparing dispersions of encapsulate particles in predominantly organic liquid vehicles.

Process

According to a first aspect of the present invention there is provided a process for preparing a dispersion of encapsulated solid particles in a predominantly organic liquid vehicle, comprising the following steps:

i) providing a dispersion comprising a particulate solid, a liquid medium and a polymeric dispersant having at least 3.0 mmoles of reactive groups per g of dispersant;

ii) cross-linking the polymeric dispersant via at least some, but not all, of the reactive groups, said cross-linking being performed in the presence of the particulate solid and the liquid medium and resulting in the encapsulation of each solid particle with a cross-linked polymeric dispersant shell;

iii) covalently bonding an end-capping agent to the polymeric dispersant via the reactive groups;

said process being such that the final organic liquid vehicle comprises one or more organic liquids and optionally water, provided that water is present at no more than 30% by weight based on the dispersion.

DEFINITIONS

As used herein the words "a" and "an" mean one or more unless stated otherwise. Thus by example "an" end-capping agent means one or more end-capping agents. Similarly, "a" particulate solid includes a mixture containing two or more particulate solids.

Liquid Vehicle

As defined herein the words liquid vehicle refer to the liquid components present at the end of the process according to the first aspect of the present invention.

The liquid vehicle is predominantly organic that is to say containing no more than 30% by weight of water relative to the final dispersion. More preferably the liquid vehicle comprises no more than 25%, more preferably no more than 20%, especially no more than 10%, more especially no more than 5% and most especially no more than 1% by weight of water based on the total dispersion.

Most preferably, the dispersion comprises only trace amounts of water which are present as impurities in one or more of the organic liquids or as a consequence of exposure of the liquid vehicle to atmospheric moisture. For example such dispersions comprise less than 1000 ppm, more preferably less than 200 ppm of water by weight relative to the total dispersion.

The organic liquid vehicle can comprise one or more organic liquids. Any organic liquid may be used but especially suitable organic liquids include monoalcohols, diols and triols, linear and cyclic amides, ketones and keto-alcohols, ethers, glycol ethers, linear and cyclic esters, sulfoxides, hydrocarbons, halo-substituted hydrocarbons and phosphate esters.

Preferred monoalcohols include methanol, ethanol, propanol, butanol, pentanol (especially pentan-1-ol), hexanol, octanol and decanol.

Preferred diols include ethylene glycol, propyleneglycol, butanediol, pentane diol, hexane diol and octane diol. Other suitable diols include polyether diols, polyester diols, polyacrylic diols, polycarbonate diols and polysiloxane diols.

A preferred triol is glycerol.

Preferred cyclic amides include 2-pyrrolidone, N-methyl-2-pyrrolidone, N-ethyl-2-pyrrolidone, caprolactam and 1,3-dimethylimidazolidone.

Preferred sulfoxides include dimethyl sulfoxide and sulfolane.

Preferred hydrocarbons include $C_{8-30}$ hydrocarbons including both aliphatic, aromatic and mixed aromatic-aliphatic hydrocarbons.

Preferred halo-substituted hydrocarbons are $C_{1-10}$ hydrocarbons substituted with one or more halogen atoms (especially Cl, Br and I).

Methyl ethyl ketone is a preferred ketone.

Preferably, the organic liquid vehicle is or comprises triethylene glycol monobutyl ether, 2-butoxy ethanol, methyl ethyl ketone, ethanol, pentan-1-ol, ethyl acetate, diethylene glycol monobutyl ether, 2-pyrrolidone, glycerol or a combination thereof. More preferably, the organic liquid vehicle is or comprises triethylene glycol monobutyl ether, ethanol, methyl ethyl ketone or a combination thereof.

The organic liquids in the organic liquid vehicle may be water-miscible or water-immiscible.

In some cases the organic liquids may each have relatively low boiling points such that they may readily evaporate. For example the organic liquids may have a boiling point of less than 200° C., more preferably less than 150° C. and especially less than 100° C.

Alternatively, it can be desirable that the organic liquids are substantially involatile and have boiling points of 200° C. or more, preferably 220° C. or more and especially 250° C. or more.

The organic liquid vehicle may comprise one or more monomers. In such cases the organic liquid vehicle may be later hardened to a solid coating by exposure to electromagnetic radiation (e.g. ultraviolet light) or particle beams (e.g. electron beams). In these cases the monomer preferably comprise at least 50%, more preferably at least 75%, especially at least 90% and more especially at least 95% by weight relative to the total organic liquid vehicle. The remainder required to make 100% is preferably one or more of the above mentioned organic liquids (which are not polymerisable). Most preferably all the organic liquids in the liquid vehicle are monomers.

Any suitable monomer may be used but preferred monomers contain one or more ethylenically unsaturated groups. Examples of monomers include styrenics, (meth) acrylates, acrylonitriles and acrylamides. Preferably, at least one of the monomers is a (meth)acrylate or a styrenic monomer. These monomers can be polymerised by free radical initiators.

Other suitable monomers include epoxides, oxetanes and vinyl ethers. These monomers can be cationically polymerised.

Particulate Solid

The particulate solid may comprise and preferably is an inorganic or organic particulate solid material or mixture thereof which is insoluble in the liquid medium and the liquid vehicle. By insoluble we mean having a solubility of no more than 1%, more preferably no more than 0.1% by weight in the liquid medium and the liquid vehicle. Preferably, the particulate solid has this level of insolubility in methyl ethyl ketone at 25° C.

Examples of suitable particulate solids are extenders and fillers for paints and plastics materials; optical brightening agents; particulate ceramic materials; magnetic particles (e.g. for use in magnetic recording media); metallic particles, polymeric particles, biocides; agrochemicals; pharmaceuticals and colorants.

Preferably, the particulate solid is or comprises a colorant. Preferably the colorant is a pigment or an insoluble dye, more preferably a pigment. Preferably, the particulate solid is or comprises a pigment.

The pigment may be organic or inorganic.

A preferred pigment is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Preferred organic pigments are phthalocyanines, especially copper phthalocyanine pigments, azo pigments, indanthrones, anthanthrones, and quinacridones.

Preferred inorganic pigments include carbon black (especially gas blacks), titanium dioxide, silicon dioxide, aluminium oxide, iron oxides and sulfides.

Any suitable pigment may be used without particular limitation. For inks especially suitable pigments are carbon blacks, C.I. Pigment Red 122, C.I. Pigment Blue 15:3 and C.I. Pigment Yellow 74.

When the particulate solid is a pigment it is preferably not surface treated so as to covalently bind dispersing groups onto its surface. Preferably, the pigment is not dispersible in water or an organic liquid without the aid of a dispersant.

Preferably, the particulate solid in the dispersion in step i) of the first aspect of the present invention has an average particle size of less than 1 micron, more preferably from 10 to 500 nm, especially from 30 to 300 nm and most preferably from 50 to 200 nm. The average particle size may be a Z or volume average size. The particle size may be measured by suitable techniques including laser light scattering. A preferred apparatus for measuring particle size is the Zetasizer™ Nano ZS90 from Malvern.

Liquid Medium

As defined herein the words liquid medium mean the liquid components of the dispersion provided in step i) of the first aspect of the present invention. This is an intermediate step to the preparation of the final dispersion of encapsulated solid particles.

The liquid medium may comprise organic liquids as mentioned above for the liquid vehicle. Preferably, the liquid medium comprises water and optionally one or more organic liquids. Preferably, the organic liquids when present along with water are water-miscible.

More preferably, it is desirable that the liquid medium comprises at least 50%, more preferably at least 75%, especially at least 90% and more especially at least 95% by weight of water relative to all the liquids present in the liquid medium. Preferably, the remainder needed to make 100% by weight is one or more water-miscible organic liquids. Preferred examples of which include pyrrolidone, n-methyl pyrrolidone, tetrahydrofuran, methanol, ethanol, propanol, acetone, methyl ethyl ketone, sulfolane, diethylene glycol and dipropylene glycol.

In some cases it is preferred that the liquid medium consists exclusively of water (and no other liquid component).

When the liquid medium comprises water and optionally one or more organic liquids at least some of the water present in step i) may be subsequently removed. This allows water to be used in large amounts in step i) whilst the liquid vehicle still meets the requirements of being a predominantly organic liquid vehicle. Water may be partially or completely removed by evaporation, distillation, membrane filtration, flushing with organic liquid or by the contact with anhydrous solid materials.

In some cases one or more organic liquids are added to the liquid medium after step iii). This can help to attain the desired final liquid vehicle composition. It can also be used to dilute any water present in the liquid medium to the amounts required in the liquid vehicle.

Polymeric Dispersant

Preferred polymeric dispersants have graft, comb or star structures, more preferably a linear structure.

The polymeric dispersant may be a homopolymer but is preferably a copolymer. Preferred copolymers are block copolymers (e.g. its monomer units are distributed throughout the copolymer in blocks such as AAAA-BBBB), more preferably the copolymeric dispersant is a random copolymer (e.g. its monomer units are distributed randomly/statistically throughout the copolymer).

Preferably, the polymeric dispersant is or comprises a polyester, polyurethane and especially a polymeric dispersant comprising the repeat units from polymerising one or more ethylenically unsaturated monomers.

Preferred polymeric dispersants are obtained from polymerising one or more ethylenically unsaturated monomers.

A preferred composition for preparing the polymeric dispersants comprises:
i) one or more ethylenically unsaturated monomers each of which has no reactive group; and
ii) one or more ethylenically unsaturated monomers each of which has reactive groups.

The reactive groups may be non-ionic (e.g. a hydroxy group), but are preferably ionic (e.g. a carboxylic acid group). The reactive groups may be a mixture of non-ionic and ionic groups.

Suitable examples of non-ionic reactive groups include —OH, —SH, —NH$_2$, —NRH wherein R is a C$_{1-6}$ alkyl group, epoxy, oxetane, keto, aldehyde, beta-diketo ester, N-methylol, and -Halo. Of these —OH is especially preferred.

The ionic reactive groups may be cationic but are preferably anionic.

Preferred anionic reactive groups include carboxylic and phosphorus containing acids (especially phosphonic and phosphoric acid groups). Preferably, the only reactive groups present in the dispersant are ionic (especially anionic groups).

Preferably, the anionic reactive groups are carboxylic acid groups.

Preferred monomers for component ii) which contain phosphorus containing acid groups include mono(acryloyloxyethyl)phosphate and mono(3-acryloyloxypropyl)phosphates) and mono(methacryloyloxyalkyl)phosphates (for example, mono(methacryloyloxyethyl)phosphate, mono(3-methacryloyloxypropyl)phosphate), vinyl phosphonic acid, vinylidene diphosphonic acid, isopropenyl phosphonic acid, 2-acrylamido-2-methylpropanephosphonic acid and styrene phosphonic acid.

Most preferred monomers for component ii) which contain carboxylic acid groups include beta carboxyl ethyl acrylate, itaconic acid, maleic acid, fumaric acid, crotonic acid, more preferably acrylic acid and especially methacrylic acid.

Preferably, the polymeric dispersant has at least 3.5 mmoles, more preferably at least 4.0 mmoles, especially at least 4.5 mmoles, more especially at least 5.0 mmoles and most especially 5.5 mmoles of reactive groups per g of dispersant.

Preferably, the polymeric dispersant has no more than 10 mmoles, more preferably no more than 9 mmoles, especially no more than 8 mmoles and more especially no more than 7 mmoles of reactive groups per g of dispersant.

Preferably, the dispersant has from 3.0 mmoles to 10 mmoles, more preferably from 4 to 9 mmoles, more especially from 5 to 8 mmoles of reactive groups per g of dispersant.

The amount of reactive groups in the polymeric dispersant may be measured or calculated by a number of methods. Where the recipe for the polymeric dispersant is known it is easily possible to simply calculate the mmoles of reactive groups based on the weight fraction of the monomers which are copolymerised so as to form the polymeric dispersant and to incorporate such groups. Where the polymeric dispersant composition is not known the amount of reactive groups can be ascertained by reaction with highly reactive mono-co-reactive compounds in different amounts and by analysis of the reaction products to look for excess mono-co-reactive compounds. In essence the amount of reactive groups would represent the maximum amount of the mono-co-reactive compound which would be consumed in the reaction. The polymeric dispersant structure can also be determined by several techniques such as NMR, IR and mass spectroscopy. When the reactive groups in the polymeric dispersant are anionic (especially acid) groups a preferred method for establishing the amounts is titration and especially potentiometric titration.

Preferably, the potentiometric titration is performed by:
i) dissolving an accurately known amount of the polymeric dispersant in a suitable solvent/water mixture (e.g. THF/water) to form a solution;
ii) increasing the pH of the solution to around 12 by adding a known amount of base;
iii) Gradually reducing the pH to 1-2 by adding an acid in known (small) quantities whilst recording the pH using a pH meter; and iv) calculating the amount of base required to neutralise the anionic (acid) groups in the polymeric dispersant.

Preferred acids for reducing the pH in step iii) include hydrochloric and sulfuric acid. The preferred base in step ii) is potassium hydroxide. This method is especially suitable wherein the polymeric dispersant has reactive groups which are carboxylic acid groups.

Preferably, the ethylenically unsaturated monomers in component ii) is/are present in at least 26 parts, more preferably at least 27 parts, especially at least 30 parts, more especially at least 40 parts and most especially at least 45 parts by weight. Component i) accounts for the remaining amount of parts needed to total 100 parts by weight.

Preferably, the ethylenically unsaturated monomers in component ii) is/are present in no more than 90 parts, more preferably no more than 80 parts, especially no more than 70 parts and most especially no more than 60 parts by weight. Component i) accounts for the remaining amount of parts needed for components i) and ii) to total 100 parts by weight.

When the dispersant has ionic groups these may be in the form of the free base, the free acid or salts thereof. For anionic groups the preferred salts are those of the alkali metal ions (especially sodium, potassium and lithium). Other suitable salts are ammonium, organic substituted ammonium and alkanolammonium salts. The degree of neutralisation is preferably from 50 to 200 mol %.

Preferred monomers for component i) include styrenic monomers (e.g. styrene, alpha methyl styrene), aromatic (meth)acrylates (especially benzyl acrylate and benzyl methacrylate), $C_{1-30}$-hydrocarbyl (meth)acrylates, butadiene, (meth)acrylates containing poly($C_{2-4}$)alkylene oxide groups ending in a alkyl group, (meth)acrylates containing alkylsiloxane or fluorinated alkyl groups and vinyl naphthalene.

Of all the monomers for component i) benzyl (meth)acrylate, and more especially benzyl methacrylate (rather than benzyl acrylate) is preferred, in our studies it provides pigment inks having particularly good stability and OD on plain paper.

Preferred Polymeric Dispersants

Consistent with the above, preferred polymeric dispersants are obtained or obtainable by polymerising a composition comprising:
i) from 10 to 84, more preferably from 20 to 83, especially from 30 to 70, more especially from 40 to 60 and most especially from 40 to 55 parts of benzyl methacrylate;
ii) from 26 to 90, more preferably from 27 to 80, especially from 30 to 70 and more especially from 40 to 60 and most especially from 45 to 60 parts of methacrylic acid;
wherein the sum of the parts i) and ii) is 100 and all parts are by weight.

The polymeric dispersants used in the present invention may be prepared synthetically or they may be obtained from commercial sources. Synthetically, the dispersants are preferably prepared by solution polymerisation of the monomer components using a free radical initiator.

Mixtures of polymeric dispersants may be used in step i). In which case at least one of the polymeric dispersants must have the required amount of reactive groups (3.0 mmoles/g). More preferably, all the dispersants present in step i) of the first aspect of the present invention each have at least 3.0 mmoles of reactive groups per g of dispersant.

The word polymeric as used herein includes polymers containing two or more repeat units, more preferably at least ten repeat units and especially at least twenty repeat units. Thus, in its broadest sense the word polymer also includes oligomers.

The polymeric dispersant preferably has a number average molecular weight of 1,000 to 1,000,000, more preferably 2,000 to 500,000, especially 3,000 to 100,000 and more especially 5,000 to 50,000. The molecular weight is preferably as measured by gel permeation chromatography ("GPC"). Polystyrene standards are preferably used to establish the molecular weight when using GPC.

Preferably, the amount of polymeric dispersant present in step i) of the first aspect of the present invention is from 10% to 100%, more preferably from 10% to 70%, especially from 30% to 70% and most especially from 40% to 60% based on the amount of particulate solid.

Preferably, the polymeric dispersant is adsorbed onto the surface of the particulate solid prior to step ii) according to the first aspect of the present invention.

Preferably, the particulate solid has been comminuted using the polymeric dispersant. Examples of comminution include ultrasonication, microfluidisation, homogenisation and bead milling.

Cross-Linking

In step ii) of the first aspect of the present invention the polymeric dispersant is cross-linked.

The words "not all of the reactive groups" as used throughout relate to the amount of reactive groups initially present in the dispersant prior to steps ii) and iii).

The cross-linking reaction may be effected by any suitable chemistry without any particular limitation provided that the cross-links are formed with the reactive groups in the dispersant. Preferably, the cross-linking is covalent cross-linking. That is to say that the polymeric dispersant becomes cross-linked by covalent bonds.

In some embodiments the polymeric dispersant may comprise reactive groups as hereinbefore described and cross-linking groups such that the polymeric dispersant may self cross-link. Preferred cross-linking groups include isocyanate, aziridine, oxetane, oxazoline, N-methylol, carbodiimide and especially epoxide groups. These cross-linking groups are especially suited to cross-linking polymeric dispersants having reactive groups such as —OH, —SH, —NH$_2$, —NRH wherein R is a $C_{1-6}$ alkyl group, carboxylic acid and phosphorus containing acid groups. In the self cross-linking case the polymeric dispersant preferably comprises carboxylic acid and/or phosphorus containing acid groups as reactive groups and epoxide groups as cross-linking groups.

Rather than use self cross-linking polymeric dispersants it is more preferred to effect cross-linking by means of a cross-linking agent.

Preferred cross-linking agents have two or more cross-linking groups, preferably the cross-linking groups are selected from those previously mentioned. Of these cross-linking groups the cross-linking agent preferably has two or more epoxy groups. Suitable epoxy cross-linking agents include the glycidyl ethers of sorbitol, polyglycerol, glycerol, pentaerythritol, trimethylolpropane, resorcinol, neopentyl glycol, 1,6-Hexanediol, hydrogenated bisphenol A, ethylene glycol, diethylene glycol, propylene glycol, dipropylene glycol, polypropylene glycol.

Preferred epoxy cross-linking agents include polyalkyleneoxide polygycidyl ethers. Of these we have found that polyethylene oxide diglycidyl ether is especially suitable. In addition, we have found that polyglycerol polygylcidyl ether is very effective as a cross-linking agent.

Because some remaining reactive groups are required in step iii) then step ii) does not cross-link all of the reactive groups initially present in the dispersant.

In some cases, the stoichiometry of the cross-linking reaction is such that at least some of the originally present reactive groups are available for step iii). In other cases it is possible to halt the cross-linking reaction in step ii) prior to reacting all the reactive groups in the dispersant. This can be done by, for example, prematurely cooling the reaction or removing cross-linking agent prior to completion of the cross-linking reaction.

Preferably, the initial molar amounts of reactive and cross-linking groups are such that assuming a theoretical 100% effective cross-linking reaction then from 1 to 50 mole %, more preferably from 5 to 40 mole %, especially from 10 to 20 mole % and most especially about 16 mole % of the reactive groups are cross-linked.

Preferably, the reaction in step ii) is performed by means of heating the dispersion, preferably to a temperature of from 40 to 100° C. To accelerate or promote the reaction it is sometimes useful to add a catalyst. A typical time required for cross-linking is from 1 to 16 hours depending of the conditions used.

The pH of the dispersion in step ii) is preferably from 5 to 13, especially from 7 to 12. When the cross-linking groups are epoxide groups it is preferred that the reaction is performed in the presence of a borate salt and/or boric acid.

End-Capping Agent

Step iii) is covalently bonding an end-capping agent to the polymeric dispersant via at least some, but not all, of the reactive groups. Again, the words not all of the reactive groups relate to the amounts initially present prior to steps ii) and iii). Thus, it is possible for example to cross-link 20 mole % of the reactive groups in step ii) and then end-cap the remaining reactive groups completely (i.e. the remaining 80% mole of that initially present) in the second step.

By the words end-capping agent we mean a compound which has only one point at which it can react with each reactive group in the polymeric dispersant. End-capping agents have only one chemical group which can be reacted with the reactive groups in the polymeric dispersant. Put another way, end-capping agents are mono-reactive compounds, having only one group which is co-reactive with the reactive groups in the dispersant. Unlike the cross-linking agents the end-capping agent is not capable of cross-linking the polymeric dispersant.

The term "end-capping agent" as used herein is preferably meant to include those compounds which cap off the reactive groups in the polymer wherever they appear in the polymeric dispersant structure. The end-capping agent molecule becomes covalently attached to the polymeric dispersant in a pendant fashion along the length of the polymeric dispersant chain and/or at the termini of the polymeric dispersant. End-capping reaction is not merely limited to the termini of the polymeric dispersant chains. Instead the "ends" which are capped are the reactive groups in the polymeric dispersant.

More than one end-capping agent may be used.

The end-capping agent preferably has a molecular weight of a least 400, more preferably at least 500, even more preferably at least 600 and especially at least 700 daltons (g/mole).

Preferably, the end-capping agent comprises one or more $C_{2-4}$ alkyleneoxy groups. Preferably, the end-capping agent comprises poly $C_{2-4}$ alkyleneoxide chains containing at least 10 $C_{2-4}$ alkyleneoxy repeat units.

Preferably, the end-capping agent comprises ethyleneoxy groups, propyleneoxy groups or combinations thereof. Of these, we have found that end-capping agents comprising propyleneoxy groups are especially useful for providing final encapsulated dispersions which are particularly colloidally stable in organic liquid vehicles.

The end-capping agent has one (and only one) co-reactive group, preferred examples of which are selected from isocyanate, aziridine, oxetane, oxazoline, N-methylol, carbodiimide and especially epoxide groups.

These end-capping agents are especially suitable for polymeric dispersants having reactive groups such as —OH, —SH, —NH$_2$, —NRH wherein R is a $C_{1-6}$ alkyl group, carboxylic acid and phosphorus containing acid groups.

A preferred end-capping reaction is between a polymeric dispersant having carboxylic acid groups as reactive groups and the end-capping agent having a single epoxy group.

Preferred end-capping agents are mono epoxides of poly $C_{2-4}$ polyalkyleneoxides (preferably polyethyleneoxide, polypropyleneoxide and mixtures thereof). Preferably, the end-capping agent contain at least 10 $C_{2-4}$ alkleneoxy repeat units. At least 10 $C_3$ alkyleneoxy (propyleneoxy) repeat units are preferred for best colloidal stability.

The end-capping step iii) is preferably performed using similar conditions as mentioned for the cross-linking step ii).

It is possible to perform steps ii) and iii) of the first aspect of the present invention simultaneously or separately. Step ii) and iii) may be performed in any order.

Preferably, the cross-linking reaction in step ii) is performed first and then the end-capping reaction iii) is performed second.

In step ii) it is preferred that the initial amounts of reactive and cross-linking groups are as previously mentioned and the end-capping agent is added in an amount of from 25 to 300 mole %, more preferably 50 to 150 mole %, even more preferably from 75 to 125 mole % and especially 90 to 110 mole % based on the moles of reactive groups theoretically left in the polymeric dispersant after the cross-linking step ii) has completed.

In some cases in step ii) it is preferred that the initial amounts of reactive and cross-linking groups are as previously mentioned and the end-capping agent is added in an amount of from 100 to 300 mole %, more preferably from 150 to 250 mole % based on the moles of reactive groups theoretically left in the polymeric dispersant after the cross-linking step ii) has completed.

Preferably, the encapsulated solid particles prepared by the present invention have an average particle size of less than 1 micron, more preferably from 10 to 500 nm, especially from 30 to 300 nm and most preferably from 50 to 200 nm. The average particle size may be a Z or volume average size. The particle size may be measured by suitable techniques including laser light scattering. A preferred apparatus for measuring particle size is the Zetasizer™ Nano ZS90 from Malvern.

As mentioned, the final liquid vehicle must be a predominantly organic liquid.

In one case the encapsulated solid particles prepared in steps i) to iii) are isolated as a dry solid and redispersed into a liquid vehicle comprising one or more organic liquids and optionally water, provided that water is present at no more than 30% by weight based on the dispersion.

Drying may be performed by any suitable means. Preferred means include spray drying, vacuum drying and especially freeze drying.

Redispersions can be effected by any means but we have found that ultrasonication is particularly effective.

The addition of trifluoroacetic acid has proved useful in assisting the redispersion.

In other cases the any water present in the liquid medium is partially or completely removed by distillation, membrane treatment or contact with anhydrous materials.

In another case the water is flushed out from the dispersion using one or more water-miscible organic liquids.

Additives

The process according to the first aspect of the present invention may further comprise adding one or more additives selected from viscosity modifiers, pH buffers, metal chelating agents, surfactants, corrosion inhibitors, biocides, dyes, unencapsulated pigments, and/or kogation reducing additives. These additives are especially suitable for preparing inks when the particulate solid is or comprises a colorant. Typically these are added after all of steps i) to iii).

The dispersions prepared by the process according to the first aspect of the present invention may be purified or may be used directly.

Preferably, the final dispersion is purified by a process which additionally comprises membrane filtration. Ultrafiltration can desirably remove any unreacted materials.

It is also often desirable to at least partly remove any oversized particulate solids. Preferred methods for this include centrifugation and filtration. Preferably, the final dispersions has been filtered through a filter having a mean pore size of 1 micron in diameter.

Dispersions Obtainable

According to a second aspect of the present invention there is provided a dispersion obtained or obtainable by the process according to the first aspect of the present invention.

When the particulate solid is a colorant (especially a pigment) these dispersions are suited to the preparation of inks and especially ink jet printing inks in predominantly organic liquids (that is to say where the liquid vehicle comprises one or more organic liquids and no more than 30% by weight of water).

The preferences for the amount of water present in the final ink (and ink jet printing ink) are as previously stated for the liquid vehicle.

Ink Jet Printing Inks

According to a third aspect of the present invention there is provided an ink jet printing ink comprising a dispersion according to the second aspect of the present invention, wherein the particulate solid is a colorant, said ink comprising no more than 30% by weight of water.

Preferably, the ink jet printer ink has a viscosity of less than 50 mPa·s, more preferably less than 30 mPa·s and especially less than 15 mPa·s, when measured at a temperature of 25° C. Preferably the viscosity is measured by a cone and plate rheometer. Preferably, the viscosity is Newtonian. Preferably, the viscosity is measured at a shear rate of 100 s$^{-1}$.

Preferably, the ink jet printer ink has a surface tension of 20 to 65 dynes/cm, more preferably 30 to 60 dynes/cm, when measured at a temperature of 25° C. The surface tension is preferably measured using an AquaPi available from Kibron.

Preferably, the ink jet printer ink has a concentration of halide ions of less than 500 parts per million, more preferably less than 100 parts per million. It is especially preferred that the ink has less than 100, more preferably less than 50 parts per million of divalent and trivalent metals. Parts per million as used above refers to parts by weight relative to the total weight of the ink. These low concentrations of ions in the resultant ink can be achieved by the abovementioned purification step.

Preferably, the process for making the ink jet printer ink includes a step for removing particles having a particle size of more than 1 micron in diameter, for example by filtration or centrifugation. Preferably, the ink jet printing ink has less than 10%, more preferably less than 2% and especially less than 1% by weight of particles having a size of greater than 1 micron in diameter relative to the weight of all the particles in the ink.

Preferably, the amount of colorant in the ink jet printer ink is from 0.1 to 15%, more preferably from 1 to 10% and especially from 3 to 10% by weight.

According to a fourth aspect of the present invention there is provided an ink jet printer cartridge comprising a chamber and an ink jet printing ink according to the third aspect of the present invention.

According to a fifth aspect of the present invention there is provided an ink jet printer comprising an ink jet printer cartridge according to the fourth aspect of the present invention.

According to a sixth aspect of the present invention there is provided the use of an ink jet printing ink according to the third aspect of the present invention for printing onto a substrate.

The present intention will now be illustrated by means of examples in which all amounts are by weight unless stated to the contrary.

EXAMPLES

In all cases the apparatus for measuring the particle sizes was the Zetasizer™ Nano ZS90 from Malvern.

Example 1

1.1. Preparation of Neutralised Dispersant Solution (ND1)

The ethylenically unsaturated monomers benzyl methacrylate (12.55 g, 71.22 mmoles) and methacrylic acid (14.00 g, 162.62 mmoles) were mixed together along with and a chain transfer agent butyl 3-mercaptopropionate (0.30 g, 1.85 mmoles). The mixture of ethylenically unsaturated monomers and the chain transfer agent were then dissolved in a liquid mixture of isopropyl alcohol (67.82 g) and dipropylene glycol (40.67 g) to give a 20% by weight solution which was charged into a reactor.

A thermal initiator, Trigonox™ 21S (0.27 g) was then added to the reactor contents, and the contents were stirred continuously whist the temperature was maintained at 85° C. for 4 hours. The reaction was performed using a nitrogen gas atmosphere throughout.

A second charge of thermal initiator, Trigonox™ 21S (0.27 g), was then added and the polymerisation was continued at a temperature of 85° C. for a further 4 hours, still using a nitrogen gas atmosphere. These steps polymerised the ethylenically unsaturated monomers to prepare the Polymeric Dispersant solution (D1).

The reactor contents were then cooled to a temperature of 25° C., poured into a rotary evaporator flask and evaporated to concentrate the Polymeric Dispersant (D1) to about 40% by weight. This step resulted in the preparation of Polymeric Dispersant solution (D1).

The molecular weights of the Polymeric Dispersant (D1) as measured by gel permeation chromatography using a DMF solvent and polystyrene standards were Mn 32,100 and Mw 51,800.

Polymer Neutralisation

The Polymeric Dispersant solution (D1) prepared directly above (67.82 g) was neutralised by the addition of a solution containing 45% by weight potassium hydroxide (16.23 g) and water (76.37 g) to give a solids content of 20% by weight. This prepared Neutralised Dispersant solution (ND1).

1.2. Aqueous Pigment Dispersion

An aqueous pigment dispersion (440 g) was prepared containing a carbon black pigment (Printex™ 55, 66 g) and Neutralised Dispersant solution (ND1) as prepared in step 1.1 (99 g) and water (275 g). The pigment dispersion was pre-mixed using a Silverson™ high shear rotor stator mixer at its highest setting for a period of approximately 1 hour.

The pre-mixture was then transferred to a Netzsch Minifer mill where it was comminuted (milled) for 10 hours at a mill speed of 2,250 rpm using ceramic beads.

After 10 hours of milling the average particle size of the pigment no longer decreased. The milled dispersion had an average particle size of about 125 nm.

1.3. Cross-Linking

The milled dispersion prepared in step 1.2 40 g was diluted to 80 g using deionized water. This resulted in a dispersion containing approximately 7.5% by weight of pigment. To this dispersion were added boric acid (1.8 g) and then the cross-linking agent (polyethyleneglycol diglycidyl ether Mw 527) (0.47 g). The dispersion was heated to 65° C. and maintained at that temperature for a period of 5 hours to allow the cross-linking reaction to proceed. This prepared a dispersion of carbon black particles encapsulated with a cross-linked dispersant shell.

1.4. End-Capping

An end-capping agent was prepared as follows:
Poly(propylene glycol) monobutyl ether (Mw about 1,000) (30 g), epichlorohydrin (8.33 g), sodium hydroxide (3.6 g), water (0.36 g) and tetrabutylammonium hydrogensulphate (0.11 g) were mixed together and stirred for 24 hours at a temperature of 40° C. The resulting reaction mixture was diluted with 30 mls of dichloromethane and filtered through a short silica gel column. The silica gel column was washed with 100 ml of dichloromethane. The desired end-capping agent (polypropylene monoepoxide, mono butyl ether) was washed off the column using 200 mls of methanol. The methanolic solution was then dried by rotary evaporation at 60° C. to isolate the end-capping agent. This was designated End-capping agent 1.

To the dispersion prepared in step 1.3 was added more boric acid (9.0 g) and the End-capping agent 1 as prepared directly above (9.44 g). The temperature was maintained at 65° C. for a further period of 5 hours so as to allow the end-capping reaction to proceed. The dispersion was then cooled to a temperature of 25° C.

1.5. Purification

The dispersion prepared in step 1.4 was diluted with deionized water so as to contain approximately 5% by weight of pigment.

This dispersion was then subjected to cross-flow membrane purification using a membrane having a pore size of about 0.1 micron in diameter. Diafiltration using this membrane and approximately 20× the volume of pure deionized water helped to remove much of the free un-reacted or un-adsorbed polymeric dispersant.

1.6. Isolation

The purified pigment dispersion prepared in step 1.5 was isolated by means of freeze drying.

1.7. Re-Dispersion and Inks

The isolated encapsulated particulate solid prepared in step 1.6 was re-dispersed in several organic liquids. Approximately 5 g of the encapsulated particulate solid per 95 g of organic liquid were mixed. The mixture was then subjected to ultrasound and optionally a drop of trifluoroacetic acid was added to assist dispersion. This method successfully prepared sub micron, stable dispersions of encapsulated pigment dispersions in a range of organic liquids including triethyleneglycol monobutyl ether, methyl ethyl ketone and ethanol.

Immediately after preparation the tri(ethylene glycol) monobutyl ether based dispersion had an average particle size of 102 nm, rising to 103 nm after 28 days storage at room temperature. The ethanol based dispersion initially had an average particle size of 187 nm, rising to 327 nm after 28 days storage at room temperature, and the methyl ethyl ketone based dispersion initially had an average particle size of 153 nm, falling to 118 nm after 28 days storage at room temperature.

Example 2

2.1. Aqueous Pigment Dispersion

An aqueous pigment dispersion (440 g) was prepared in exactly the same way as in Example 1, step 1.2.

2.2. Cross-Linking

The milled dispersion prepared in step 2.1 (40 g) was diluted to 80 g using de-ionised water. This resulted in a dispersion containing approximately 7.5% by weight of pigment. To this dispersion was added solution containing 6.18% by weight of boric acid (1.8 g) and then the cross-linking agent poly (ethylene glycol) diglycidyl ether (Mw 527) (0.47 g). The dispersion was heated to 65° C. and maintained at that temperature for a period of 5 hours to allow the cross-linking reaction to proceed. This prepared a dispersion of carbon black particles encapsulated with a cross-linked dispersant shell.

2.3. End-Capping

An end-capping agent was prepared as follows:
Poly(ethylene glycol) monomethyl ether (Mn ~750) (99.75 g), sodium hydroxide flakes (14 g), de-ionised water (1.60 g) and tetrabutyl ammonium hydrogen sulphate (0.50 g) were mixed together and stirred at a temperature of 40° C. Epichlorohydrin (37 g) was then added drop-wise over a period of around 30 minutes and the temperature maintained at 40° C. for a further period of 4 hours before cooling to room temperature.

Approximately 100 mL dichloromethane was added to the reaction mixture, producing an opaque solution. The solution was filtered and the remainder of the end-capping agent washed off with further addition of dichloromethane. The solvent was evaporated from the filtrate using a rotary evaporator set at 60° C. This step resulted in the preparation of End-capping agent 2 (Mw 792).

To the dispersion prepared in step 2.2 was added more solution containing 6.18% by weight of boric acid (9.0 g) and the above prepared End-capping agent 2 (9.44 g). The temperature was maintained at 65° C. for a further period of 5 hours so as to allow the end-capping reaction to proceed. The dispersion was then cooled to a temperature of 25° C.

2.4. Purification

The dispersion prepared in step 2.3 was purified as described for Example 1 step 1.5.

2.5. Isolation

The purified pigment dispersion prepared in step 2.4 was isolated by means of freeze-drying.

2.6. Re-Dispersion and Inks

The isolated encapsulated particulate solid prepared in step 2.5 was re-dispersed in several organic liquids using the same procedure as that of Example 1, step 1.7.

Immediately after preparation the tri(ethylene glycol) monobutyl ether based dispersion had an average particle size of 118 nm, the methyl ethyl ketone based dispersion had an average particle size of 134 nm and the ethanol based dispersion had an average particle size of 154 nm.

Example 3

3.1. Preparation of Neutralised Dispersant Solution (ND2)

The ethylenically unsaturated monomers benzyl methacrylate (16.98 g, 96.36 mmoles) and methacrylic acid (7.54 g, 87.58 mmoles) were mixed together along with a chain transfer agent butyl 3-mercaptopropionate (0.24 g, 1.49 mmoles). The mixture of ethylenically unsaturated monomers and the chain transfer agent was then dissolved in a liquid mixture of isopropyl alcohol (67.82 g) and dipropylene glycol (40.67 g) to give a 20% by weight solution which was charged into a reactor.

A thermal initiator, Trigonox™ 21S (0.25 g), was then added to the reactor and the contents stirred continuously whist the temperature was maintained at 85° C. for 4 hours. The reaction was performed using a nitrogen gas atmosphere throughout.

A second charge of thermal initiator Trigonox™ 21S (0.25 g) was then added and the polymerisation continued at a temperature of 85° C. for a further 4 hours, still using a nitrogen gas atmosphere. These steps polymerised the ethylenically unsaturated monomers to prepare the polymeric dispersant.

The reactor contents were added drop-wise to 1 L of rapidly stirring de-ionised water to precipitate the polymer, which was then filtered off using a Buchner funnel. A further 500 mL of de-ionised water was used to rinse the polymer at this stage. The polymer was air-dried for 24 hours and then vacuum-dried for 48 hours. This step resulted in the preparation of Polymeric Dispersant solid (D2).

The molecular weights of the Polymeric Dispersant (D2) as measured by gel permeation chromatography using a DMF solvent and polystyrene standards were Mn 35,200 and Mw 62,200.

Polymer Neutralisation

The Polymeric Dispersant solid (D2) prepared directly above (15 g) was neutralised by the addition of a solution containing 10% by weight of potassium hydroxide (23.56 g) and de-ionised water (36.44 g) to give a solids content of 22% by weight. The mixture was heated to a temperature of approximately 70° C. whilst stirring and maintained at that temperature until the polymer was seen to dissolve. This prepared Neutralised Dispersant solution (ND2).

3.2. Aqueous Pigment Dispersion

An aqueous pigment dispersion (180 g) was prepared containing C.I. Pigment Violet 19 (TRM11, 27 g) and Neutralised Dispersant solution (ND2) as prepared in step 3.1 (67.5 g) and de-ionised water (85.5 g). The pigment dispersion was initially prepared in 6×30 g batches in 60 mL glass jars, each containing 60 g of 3 mm glass beads. The pigment dispersion batches were pre-mixed using a Red-Devil™ paint shaker for a period of 6 hours, after which they were separated from the beads and combined.

The pre-mixture was then comminuted (milled) in 6×30 g batches in 30 mL glass jars using a dual-horn Branson Digital Sonifier® Model 450 sonic mill fitted with 13 mm diameter solid high intensity tips and operated at an amplitude setting of 60%.

After 5 hours of milling the average particle size of the pigment no longer decreased. The milled dispersion had an average particle size of approximately 100 nm.

3.3. Cross-Linking

The milled dispersion prepared in step 3.2 (10 g) was diluted to 20 g using de-ionised water. This resulted in a dispersion containing approximately 7.5% by weight of pigment. To this dispersion were added a solution containing 6.18% by weight of boric acid (0.44 g) and then the cross-linking agent poly(ethylene glycol) diglycidyl ether (Mw 527) (0.12 g). The dispersion was heated to 65° C. and maintained at that temperature for a period of 5 hours to allow the cross-linking reaction to proceed. This prepared a dispersion of C.I. Pigment Violet 19 particles encapsulated with a cross-linked dispersant shell.

3.4. End-Capping

An end-capping agent was prepared as follows:
Poly(ethylene glycol) hexadecyl ether (Brij™ 58) (Mn about 1,150) (26.98 g), sodium hydroxide (2.38 g), water (0.29 g) and tetrabutylammonium hydrogensulphate (0.084 g) were mixed together before epichlorohydrin (6.66 g) was added dropwise over 30 minutes. The resulting mixture was stirred for 12 hours at a temperature of 40° C. The resulting reaction mixture was diluted with 40 mls of dichloromethane and filtered through a short silica gel column. The silica gel column was washed with 500 ml of dichloromethane. The desired end-capping agent (Brij™ 58 monoepoxide) was washed off the column using 800 mls of methanol. The methanolic solution was then dried by rotary evaporation at 60° C. to isolate the end-capping agent). This was designated End-capping agent 3.

To the dispersion prepared in step 3.3 was added further solution containing 6.18% by weight of boric acid (2.19 g) and the above prepared End-capping agent 3 (2.58 g). The temperature was maintained at 65° C. for a further period of 5 hours so as to allow the end-capping reaction to proceed. The dispersion was then cooled to a temperature of 25° C.

3.5. Purification

The dispersion prepared in step 3.4 was purified as described for Example 1, step 1.5.

3.6. Isolation

The purified pigment dispersion prepared in step 3.5 was isolated by means of freeze-drying.

3.7. Re-Dispersion and Inks

The isolated encapsulated particulate solid prepared in step 3.6 was re-dispersed in several organic liquids using the same procedure as that of Example 1, step 1.7.

Immediately after preparation the tri(ethylene glycol) monobutyl ether based dispersion had an average particle size of 135 nm, rising to 187 nm after 28 days storage at room temperature. The di(ethylene glycol) diethyl ether based dispersion initially had an average particle size of 115 nm, rising to 126 nm after 28 days storage at room temperature, and the methyl ethyl ketone based dispersion initially had an average particle size of 127 nm, rising to 132 nm after 28 days storage at room temperature.

Example 4

4.1. Preparation of Neutralised Dispersant Solution (ND3)

The Polymeric dispersant (D3) was prepared following the procedure described for D2 (Example 3, step 3.1) but with different amounts of monomers. For Polymeric dispersant D3 the monomers benzyl methacrylate (14.16 g, 80.36 mmoles) and methacrylic acid (10.33 g, 119.99 mmoles) were used together with the chain transfer agent butyl 3-mercaptopropionate (0.26 g, 1.61 mmoles).

The molecular weights of the Polymeric Dispersant (D3) as measured by gel permeation chromatography using a DMF solvent and polystyrene standards were Mn 36,700 and Mw 63,200.

Polymer Neutralisation

The Polymeric Dispersant solid (D3) prepared directly above (15 g) was neutralised by the addition of a solution containing 10% by weight of potassium hydroxide (32.31 g) and de-ionised water (27.69 g) to give a solids content of 23% by weight. The mixture was heated to a temperature of approximately 70° C. whilst stirring and maintained at that temperature until the polymer was seen to dissolve. This prepared Neutralised Dispersant solution (ND3).

4.2. Aqueous Pigment Dispersion

An aqueous pigment dispersion pre-mixture containing C.I. Pigment Violet 19 was prepared as described in Example 3, step 3.2 but Neutralised Dispersant solution (ND3) was used instead of (ND2).

The pre-mixture was then comminuted (milled) in 6×30 g batches in 30 mL glass jars using a dual-horn Branson Digital Sonifier™ Model 450 sonic mill fitted with 13 mm diameter solid high intensity tips and operated at an amplitude setting of 60%. After 5 hours of milling the average particle size of the pigment no longer decreased. The milled dispersion had an average particle size of approximately 100 nm.

4.3. Cross-Linking

The milled dispersion prepared in step 4.2 (10 g) was diluted to 20 g using de-ionised water. This resulted in a dispersion containing approximately 7.5% by weight of pigment. To this dispersion were added a solution containing 6.18% by weight of boric acid (0.60 g) and then the cross-linking agent poly(ethylene glycol) diglycidyl ether (Mw 527) (0.16 g). The dispersion was heated to 65° C. and maintained at that temperature for a period of 5 hours to allow the cross-linking reaction to proceed. This prepared a dispersion of C.I. Pigment Violet 19 particles encapsulated with a cross-linked dispersant shell.

4.4. End-Capping

To the dispersion prepared in step 4.3 was added further solution containing 6.18% by weight of boric acid (3.00 g) and End-capping agent 3 (3.54 g) as prepared in Example 3, step 3.4. The temperature was maintained at 65° C. for a further period of 5 hours so as to allow the end-capping reaction to proceed. The dispersion was then cooled to a temperature of 25° C.

4.5. Purification

The dispersion prepared in step 4.4 was purified as described for Example 1 step 1.5.

4.6. Isolation

The purified pigment dispersion prepared in step 4.5 was isolated by means of freeze-drying.

4.7. Re-Dispersion and Inks

The isolated encapsulated particulate solid prepared in step 4.6 was re-dispersed in several organic liquids using the same method as described in Example 1, step 7.

Immediately after preparation the tri(ethylene glycol) monobutyl ether based dispersion had an average particle size of 114 nm, rising to 125 nm after 28 days storage at room temperature. The di(ethylene glycol) diethyl ether based dispersion initially had an average particle size of 110 nm, which was unchanged after 28 days storage at room temperature, and the methyl ethyl ketone based dispersion initially had an average particle size of 141 nm, rising to 146 nm after 28 days storage at room temperature.

Example 5

5.1. Preparation of Neutralised Dispersant Solution (ND4)

The Polymeric dispersant (D4) was prepared following the procedure described for D2 (Example 3, step 3.1) but with different amounts of monomers. For Polymeric Dispersant D4 the monomers benzyl methacrylate (11.57 g, 65.66 mmoles) and methacrylic acid (12.90 g, 149.84 mmoles) were used together with the chain transfer agent butyl 3-mercaptopropionate (0.28 g, 1.73 mmoles).

The molecular weights of the Polymeric Dispersant (D4) as measured by gel permeation chromatography using a DMF solvent and polystyrene standards were Mn 32,700 and Mw 61,200.

Polymer Neutralisation

The Polymeric Dispersant solid (D4) prepared above (15 g) was neutralised by the addition of a solution containing 10% by weight of potassium hydroxide (40.39 g) and de-ionised water (19.61 g) to give a solids content of 24% by weight. The mixture was heated to a temperature of approximately 70° C. whilst stirring and maintained at that temperature until the polymer was seen to dissolve. This prepared Neutralised Dispersant solution (ND4).

5.2. Aqueous Pigment Dispersion

An aqueous pigment dispersion pre-mixture containing C.I. Pigment Violet 19 was prepared as described Example 3, step 3.2 but Neutralised Dispersant solution (ND4) was used instead of (ND2).

The pre-mixture was then comminuted (milled) in 6×30 g batches in 30 mL glass jars using a dual-horn Branson Digital Sonifier® Model 450 sonic mill fitted with 13 mm diameter solid high intensity tips and operated at an amplitude setting of 60%.

After 3 hours of milling the average particle size of the pigment no longer decreased. The milled dispersion had an average particle size of approximately 100 nm.

5.3. Cross-Linking

The milled dispersion prepared in step 5.2 (10 g) was diluted to 20 g using de-ionised water. This resulted in a dispersion containing approximately 7.5% by weight of pigment. To this dispersion were added a solution containing 6.18% by weight of boric acid (0.75 g) and then the cross-linking agent poly(ethylene glycol) diglycidyl ether (Mw 527) (0.20 g). The dispersion was heated to 65° C. and maintained at that temperature for a period of 5 hours to allow the cross-linking reaction to proceed. This prepared a dispersion of C.I. Pigment Violet 19 particles encapsulated with a cross-linked dispersant shell.

5.4. End-Capping

To the dispersion prepared in step 5.3 was added further solution containing 6.18% by weight of boric acid (3.75 g) and the End-capping agent 3 (4.42 g) as prepared in step 3.4. The temperature was maintained at 65° C. for a further period of 5 hours so as to allow the end-capping reaction to proceed. The dispersion was then cooled to a temperature of 25° C.

5.5. Purification

The dispersion prepared in step 5.4 was purified as described for Example 1, step 1.5.

5.6. Isolation

The purified pigment dispersion prepared in step 5.5 was isolated by means of freeze-drying.

5.7. Re-Dispersion and Inks

The isolated encapsulated particulate solid prepared in step 5.6 was re-dispersed in several organic liquids using the method as described in Example 1, step 1.7.

Immediately after preparation the tri(ethylene glycol) monobutyl ether based dispersion had an average particle size of 93 nm, rising to 109 nm after 28 days storage at room temperature. The di(ethylene glycol) diethyl ether based dispersion initially had an average particle size of 122 nm, falling to 116 nm after 28 days storage at room temperature, and the methyl ethyl ketone based dispersion initially had an average particle size of 140 nm, falling to 121 nm after 28 days storage at room temperature.

Example 6

6.1. Preparation of Neutralised Dispersant Solution (ND5)

The Polymeric Dispersant D5 was prepared in the same way as Polymeric Dispersant D2 except the amounts used were twice as large.

The molecular weights of the Polymeric Dispersant (D5) as measured by gel permeation chromatography using a DMF solvent and polystyrene standards were Mn 35,000 and Mw 62,700.

Polymer Neutralisation

The Polymeric Dispersant solid (D5) prepared above (15 g) was neutralised by the addition of a solution containing 10% by weight of potassium hydroxide (23.56 g) and de-ionised water (36.44 g) to give a solids content of 22% by weight. The mixture was heated to a temperature of approximately 70° C. whilst stirring and maintained at that temperature until the polymer was seen to dissolve. This prepared Neutralised Dispersant solution (ND5).

6.2 Aqueous Pigment Dispersion

An aqueous pigment dispersion (1000 g) was prepared containing C.I. Pigment Violet 19 pigment (TRM11, 150 g) and Neutralised Dispersant solution (ND5) as prepared in step 6.1 (225 g) and de-ionised water (625 g). The pigment dispersion was pre-mixed using a Silverson™ high shear rotor stator mixer at its highest setting for a period of approximately 1 hour.

The pre-mixture was then transferred to a Netzsch MiniCer mill where it was comminuted (milled) for 11 hours at a mill speed of 4200 rpm using polymeric beads, after which time the average particle size of the pigment no longer decreased. The milled dispersion had an average particle size of approximately 116 nm.

6.3. Cross-Linking

The milled dispersion prepared in step 6.2 (100 g) was diluted to 200 g using de-ionised water. This resulted in a dispersion containing approximately 7.5% by weight of pigment. To this dispersion were added a solution containing 6.18% by weight of boric acid (2.61 g) and then the cross-linking agent poly(ethylene glycol) diglycidyl ether (Mw 527) (0.69 g). The dispersion was heated to 70° C. and maintained at that temperature for a period of 5 hours to allow the cross-linking reaction to proceed. This prepared a dispersion of C.I. Pigment Violet 19 particles encapsulated with a cross-linked dispersant shell.

6.4. End-Capping

To the dispersion prepared in step 6.3 was added further solution containing 6.18% by weight of boric acid (13.05 g) and the end-capping agent mono lauryl $(EO)_{15}$ glycidyl ether (Denacol EX171™ 17.68 g). The temperature was maintained at 70° C. for a further period of 5 hours so as to allow the end-capping reaction to proceed. The dispersion was then cooled to a temperature of 25° C.

6.5. Purification

The dispersion prepared in step 6.4 was purified as described for Example 1, step 1.5.

6.6. Isolation

The purified pigment dispersion prepared in step 6.5 was isolated by means of freeze-drying.

6.7. Re-Dispersion and Inks

The isolated encapsulated particulate solid prepared in step 6.6 was re-dispersed in several organic liquids using the same method as described in Example 1, step 1.7.

Immediately after preparation the tri(ethylene glycol) monobutyl ether based dispersion had an average particle size of 159 nm and the di(ethylene glycol) diethyl ether based dispersion had an average particle size of 110 nm.

Example 7 (Comparative Example)

7.1. Aqueous Pigment Dispersion

An aqueous pigment dispersion (180 g) was prepared in exactly the same way as in Example 3, step 3.2.

7.2. End-Capping

The milled dispersion prepared in step 7.1 was not cross-linked and only an End-Capping reaction was carried out.

The pigment dispersion prepared in step 7.1 (10 g) was diluted to 20 g using de-ionised water. This resulted in a dispersion containing approximately 7.5% by weight of pigment. To this dispersion was added a solution containing 6.18% by weight of boric acid (2.63 g) and End-capping agent 3 (3.09 g) as prepared in Example 3, step 3.4. The dispersion was heated to 70° C. and maintained at that temperature for a period of 5 hours to allow the end-capping reaction to proceed. The dispersion was then cooled to a temperature of 25° C.

7.3. Purification

The dispersion prepared in step 7.2 was purified as described for Example 1, step 1.5.

7.4. Isolation

The purified pigment dispersion prepared in step 7.3 was isolated by means of freeze-drying.

7.5. Re-Dispersion and Inks

The isolated particulate solid prepared in step 7.4 was re-dispersed in several organic liquids using the same procedure as that of Example 1, step 1.7.

Immediately after preparation the tri(ethylene glycol) monobutyl ether based dispersion had an average particle size of 404 nm, the di(ethylene glycol) diethyl ether based dispersion had an average particle size of 939 nm and the methyl ethyl ketone based dispersion had an average particle size of 431 nm. Sedimentation was observed in the dispersions after storage at room temperature for 1 week. This showed the marked colloidal instability of the comparative dispersions in organic liquid vehicles.

8. Preparation and Printing of Inks Using a DMP-2800

8.1 Inks Using Example 3

A dispersion of Example 3 material in tri(ethylene glycol) monobutyl ether was prepared as described for Example 3 step 3.7. The dispersion was filtered using a Minisart GF syringe filter. To 15.8 g of the filtered dispersion 4.0 g ethanol and 0.2 g Surfynol™ 465 was added. This dispersion was filtered trough a Minisart GF syringe filter into 10 pL cartridges for a Dimatix Material Printer DMP-2800. The cartridges were left open for 20 minutes to degas the ink. After optimizing the print waveform 1×2 cm blocks were printed on different media and the reflective optical density (ROD) was measured using GregtagMacbeth's Spectrolino™ spectrophotometer.

The following ROD values were recorded:

| | | |
|---|---|---|
| Plain Paper: | Canon GF500: | 0.94 |
| | HP All-in-one Printing Paper: | 0.81 |
| | Xerox Commercial 4200: | 0.86 |
| Photo Paper: | Epson Crispia: | 1.72 |
| | Canon Pro Platinum PT-101: | 1.78 |
| | Canon Photo Paper Pro PR-101: | 1.80 |

8.2 Inks Using Example 6

A dispersion of Example 6 material in tri(ethylene glycol) monobutyl ether was prepared as described for Example 6 step 6.7. The dispersion was filtered using a Minisart GF syringe filter. To 15.8 g of the filtered dispersion 4.0 g ethanol and 0.2 g Surfynol™ 465 was added. This dispersion was filtered trough a Minisart GF syringe filter into 10 pL cartridges for a Dimatix Material Printer DMP-2800. The cartridges were left open for 20 minutes to degas the ink. After optimizing the print waveform 1×2 cm blocks were printed on different media and the reflective optical density was measured using GregtagMacbeth's Spectrolino™ spectrophotometer.

The following RODs were recorded:

| | | |
|---|---|---|
| Plain Paper: | Canon GF500: | 1.10 |
| | HP All-in-one Printing Paper: | 1.02 |
| | Xerox Commercial 4200: | 1.12 |
| Photo Paper: | Epson Crispia: | 2.25 |
| | Canon Pro Platinum PT-101: | 2.25 |
| | Canon Photo Paper Pro PR-101: | 2.21 |

Thus, it can be seen that the process according to the present invention provides dispersions in organic liquid vehicles which are colloidally stable, which print effectively and with good optical density.

The invention claimed is:

1. A dispersion of encapsulated solid particles in a predominantly organic liquid vehicle, obtained by a process comprising the following steps:
   i) providing a dispersion comprising a particulate solid, a liquid medium and a polymeric dispersant having at least 3.0 mmoles of reactive groups per g of dispersant;
   ii) cross-linking the polymeric dispersant via at least some, but not all, of the reactive groups, said cross-linking being performed in the presence of the particulate solid and the liquid medium and resulting in the encapsulation of each solid particle with a cross-linked polymeric dispersant shell;
   iii) covalently bonding an end-capping agent to the polymeric dispersant via the reactive groups;
   said process being such that a final organic liquid vehicle comprises one or more organic liquids and optionally water, provided that water is present at no more than 30% by weight based on the dispersion.

2. The dispersion according to claim 1 wherein the liquid medium in step i) comprises water and optionally one or more organic liquids.

3. The dispersion according to claim 1 wherein the dispersant in step i) has at least 3.5 mmoles of reactive groups per g of dispersant.

4. The dispersion according to claim 1 wherein the end-capping agent in step iii) has a molecular weight of at least 400 daltons.

5. The dispersion according to claim 1 wherein the end-capping agent in step iii) comprise one or more $C_{2-4}$ alkyleneoxy groups.

6. The dispersion according to claim 5 wherein the end-capping agent in step iii) comprises ethyleneoxy groups, propyleneoxy groups or combinations thereof.

7. The dispersion according to claim 5 wherein the end-capping agent in step iii) comprises poly $C_{2-4}$alkyleneoxide chains containing at least 10 $C_{2-4}$alkyleneoxy repeat units.

8. The dispersion according to claim 1 wherein the end-capping agent has a single group selected from isocyanate, aziridine, oxetane, oxazoline, N-methylol, carbodiimide and epoxide groups.

9. The dispersion according to claim 1 wherein the organic liquid vehicle is or comprises triethylene glycol monobutyl ether, 2-butoxy ethanol, methyl ethyl ketone, ethanol, pentan-1-ol, ethyl acetate, diethylene glycol monobutyl ether, 2-pyrrolidone, glycerol or a combination thereof.

10. The dispersion according to claim 1 wherein the dispersant in step i) is obtained from polymerising a composition comprising:
   i) from 10 to 84 parts of benzyl methacrylate;
   ii) from 26 to 90 parts of methacrylic acid;
   wherein the sum of the parts i) and ii) is 100 and all parts are by weight.

11. The dispersion according to claim 1 further comprising one or more additives selected from viscosity modifiers, pH buffers, metal chelating agents, surfactants, corrosion inhibitors, biocides, dyes, unencapsulated pigments, and/or kogation reducing additives.

12. The dispersion according to claim 1 wherein the particulate solid is or comprises a colorant.

13. The dispersion according to claim 1 wherein the particulate solid is a pigment.

14. An ink jet printing ink comprising a dispersion according to claim 1, wherein the particulate solid is a colorant, said ink comprising no more than 30% by weight of water.

15. An ink jet printer cartridge comprising a chamber and an ink jet printing ink wherein the ink jet printing ink is present in the chamber and is according to claim 14.

16. An ink jet printer comprising an ink jet printer cartridge according to claim 15.

17. A process for preparing a dispersion of encapsulated solid particles in a predominantly organic liquid vehicle, comprising the following steps:
   i) providing a dispersion comprising a particulate solid, a liquid medium and a polymeric dispersant having at least 3.0 mmoles of reactive groups per g of dispersant;
   ii) cross-linking the polymeric dispersant via at least some, but not all, of the reactive groups, said cross-linking being performed in the presence of the particulate solid and the liquid medium and resulting in the encapsulation of each solid particle with a cross-linked polymeric dispersant shell;
   iii) covalently bonding an end-capping agent to the polymeric dispersant via the reactive groups;
   said process being such that the final organic liquid vehicle comprises one or more organic liquids and optionally water, provided that water is present at no more than 30% by weight based on the dispersion.

18. The process according to claim 17 wherein at least some of the water present in step i) is subsequently removed.

19. The process according to claim 17 wherein one or more organic liquids are added to the liquid medium after step iii).

20. The process according to claim 17 wherein the encapsulated solid particles prepared in steps i) to iii) are isolated as a dry solid and redispersed into a liquid vehicle comprising one or more organic liquids and optionally water, provided that water is present at no more than 30% by weight based on the dispersion.

* * * * *